United States Patent [19]
Singule et al.

[11] Patent Number: 6,132,503
[45] Date of Patent: Oct. 17, 2000

[54] PROCESS FOR BINDING LIGNOCELLULOSIC MATERIAL

[76] Inventors: Bart Singule, Neysetterstraat 22, 3150 Wespelaar (Haacht), Belgium; James Anthony Yavorsky, 391 Megan Dr., Mickleton, N.J. 08056

[21] Appl. No.: 09/286,039

[22] Filed: Apr. 5, 1999

Related U.S. Application Data

[62] Division of application No. 08/887,189, Jul. 2, 1997, Pat. No. 5,908,996, which is a continuation of application No. 08/822,256, Mar. 20, 1997, abandoned.

[30] Foreign Application Priority Data

Jul. 1, 1996 [EP] European Pat. Off. .............. 96110580

[51] Int. Cl.$^7$ ..................................................... C08L 91/06
[52] U.S. Cl. ............................................ 106/271; 524/276
[58] Field of Search .................................... 106/270, 271; 524/14, 276

[56] References Cited

U.S. PATENT DOCUMENTS

| 3,850,658 | 11/1974 | Gomez et al. | 252/8.61 |
| 4,129,507 | 12/1978 | Marshall et al. | 252/8.82 |
| 4,434,196 | 2/1984 | Robinson et al. | 427/389 |

*Primary Examiner*—Peter A. Szekely
*Attorney, Agent, or Firm*—Kevin J. Boland

[57] ABSTRACT

Process for the production of sheets or molded bodies from lignocellulosic materials utilizing an organic polyisocyanate binder material and a release agent which is an aqueous emulsion of a polyolefin wax.

7 Claims, No Drawings

PROCESS FOR BINDING LIGNOCELLULOSIC MATERIAL

This is a divisional under 35 U.S.C. section 120 of U.S. Ser. No. 08/887,189 filed on Jul. 2, 1997 now U.S. Pat. No. 5,908,996 which is a continuation of Ser. No. 08/822,256 abandoned, filed Mar. 20, 1997.

This invention relates to processes for binding lignocellulosic material and in particular to such processes utilising polyisocyanate binders and release agents.

Organic polyisocyanates are known to be superior binders for use with lignocellulosic material, particularly in the manufacture of sheets or molded bodies such as waferboard, chipboard, fiberboard, plywood, etc. In a typical process the organic polyisocyanate, optionally in the form of a solution, dispersion or aqueous emulsion, is applied to the lignocellulosic material which is then subjected to heat and pressure. Organic polyisocyanates offer many benefits to conventional binder materials in addition to their superior binding qualities. For example, the use of organic polyisocyanates reduces manufacturing downtime by allowing blenders to be cleaned with greater ease. Also, the organic polyisocyanates improve process efficiency by allowing pressing to take place at higher moisture levels, thereby increasing throughput without increasing emissions.

However, although the organic polyisocyanates provide excellent adhesive properties, they have demonstrated an inherent disadvantage in that they can cause severe sticking of the lignocellulosic material to the metal surfaces of the press plates with which it comes into contact during the pressing operations. Often the final product is damaged during removal from the press and significant time is required to remove the lignocellulosic material from the surfaces of the press plates.

In order to avoid such adhesion problems, other binding agents, such as phenol formadehyde, are often used in the faces of the boards to be produced, since such binding agents generally cause less sticking of the lignocellulosic material to the surfaces of the press plates. Additionally, barriers such as phenolic impregnated paper, have been used to make products commercially. The phenolic paper is used to cover the strands of lignocellulosic material so that no polyisocyanate coated strands come into contact with the hot press platens. After pressing, the paper is adhered to the panel and becomes part of the final product. However, due to the significant increase in manufacturing costs, such solutions are viable only for very high grade products, such as siding and concrete forms.

The majority of the attempts at solving the adhesion problems that occur with organic polyisocyanate binders focus on the use of release agents such as oils, wax polishes, metallic soaps, silicones and polytetrafluoroethylene. These agents can be used internally, i.e., as an emulsion or mixture with the organic polyisocyanate or externally, i.e., applied to the metal surfaces of the press plates or to the lignocellulosic material itself.

In general, commonly used internal release agents have not demonstrated significant improvements in release properties or have proven to be too expensive or detrimental to the physical properties of the resulting product. Further apart from providing satisfactory release the polyisocyanate compositions containing internal release agents should be stable for a time long enough to allow proper processing of the polyisocyanate/release agent combination on wood binding production lines.

The only external release agent which is currently used is potassium oleate. However, at typical press temperatures, potassium oleate causes discoloration of the lignocellulosic material and causes throat irritation in the press operators. The press temperatures can be lowered in order to significantly eliminate the color problem, however, the resultant decrease in efficiency of the pressing operations is commercially unacceptable. Moreover, an acceptable solution to the problem of throat irritation to the operators has yet to be found.

The use of wax release agents in the binding of lignocellulosic material with polyisocyanates is described in, for example, EP 46014 and EP 57502. The wax is preferably applied in the form of an aqueous dispersion, preferably a dispersion in an aqueous emulsion of the polyisocyanate. Montan wax is preferably used.

However release performance of lignocellulosic bodies bound with polyisocyanate compositions using the above described wax release agents are still not satisfactory insofar that practical usage is limited to 185° C. platen temperature.

Therefore it is an object of the present invention to provide a release agent which can be used internally as well as externally and which will provide satisfactory release of the lignocellulosic bodies bound with the organic polyisocyanate material without detrimentally affecting the other board properties or causing physical concerns for the press operators.

The present invention provides a process for the production of sheets or molded bodies from lignocellulosic materials utilising an organic polyisocyanate binder material and a release agent which is an aqueous emulsion of a polyolefin wax.

The polyolefin wax to be used in the process of the present invention must be dispersible in an aqueous medium to form an aqueous emulsion. Thus, the polyolefins should be functionalised in order to improve the dispersability in aqueous medium. It is preferred that the polyolefins be functionalised by means of oxidation which has the added benefit of improving the release properties of the polyolefin. Preferably, the polyolefin waxes are selected from oxidised polyethylene waxes and oxidised polypropylene waxes.

The oxidised polyethylene waxes are preferably oxidised homopolymers of polyethylene or copolymers of polyethylene and $\alpha,\beta$-unsaturated carboxylic acids, such as acrylic acid.

Preferably, the oxidised polyethylene wax will have a melting temperature in the range 80 to 120° C., a viscosity in the range 25 to 200 cPs at 140° C. and a hardness in the range of 0.5 to 98 dmm. The number average molecular weight of the oxidised polyethylene wax is preferably in the range 500 to 5000, most preferably 500 to 1500.

A particularly preferred polyethylene wax to be used in the process of the present invention is AC 6702 available from Allied-Signal.

The oxidised polypropylene waxes useful in the present invention include oxidised homopolymers of polypropylene having a softening point of about 100 to about 170° C., a penetration hardness of about 0.1 to 5 dmm and a number average molecular weight of about 3000 to about 30000 and preferably about 4000 to about 12000.

A particularly preferred polypropylene wax which can be used in the process of the present invention is Epolene-43 available from Eastman Chemicals.

The aqueous emulsion of the polyolefin wax used as the release agent according to the present invention can be made by any method known to those skilled in the art, such as by high shear mixing. However, the emulsion will preferably further comprise an emulsifier to improve the capability of the polyolefin with the aqueous medium. Suitable emulsifiers used can either be anionic, non-ionic or cationic emulsifiers, with anionic emulsifiers being preferred in case the wax emulsion is used as external release agent and non-ionic emulsifiers being preferred in case in the wax emulsion is used as internal release agent. The emulsifiers are used in an amount of about 1 to about 10 and preferably about 4 to about 7% by weight of the total emulsion.

Examples of suitable anionic emulsifiers include the carboxylates, sulphates, sulphonates and phosphates, such as alkylbenzene derivatives; alkyl ether carboxylic acids and salts, e.g., sodium alkyl ether carboxylates; alkyl sulphosuccinates, e.g., di-sodium monoalkylsulphosuccinate, sodium di-alkyl sulphosuccinates and disodium monoalkyl ethoxy sulphosuccinates; alpha olefin sulphonates; aromatic hydrocarbon sulphonic acids, e.g., benzene sulphonic acid blends, cumene sulphonic acid, phenol sulphonic acid, toluene sulphonic acid and xylene sulphonic acid; aromatic hydrocarbon sulphonate salts, e.g., ammonium xylene sulphonate, dihydroxyl diphenyl sulphones, naphthalene sulphonates and sodium toluene sulphonates; fatty alcohol ethoxy sulphates, e.g., ammonium lauryl ethoxy sulphates and triethanolamine lauryl ethoxy sulphate; fatty alcohol sulphates, e.g., ammonium lauryl sulphates, monoethanolamine lauryl sulphate and sodium alkyl sulphates; and phosphate esters, e.g., alkyl phenol ethoxy phosphate ester and fatty alcohol phosphate ester.

Examples of suitable non-ionic emulsifiers include fatty acid esters of alcohols, ethylene glycol, polyethylene glycol, propylene glycol, glycerine, polyglycerine, sorbitol, pentaerythritol, polyamines, polyglycol ethers of alcohols, thioalcohols, fatty acid esters, fatty acid amines, fatty acid alkanolamides, alkyl phenols, polysiloxanes, polypropylene glycol, ethers of alcohols, fatty acids, fatty amines, and oxo-alcohols such as isooctyl-alcohol. These non-ionic emulsifiers can be made anionic through their combination with suitable basic materials, such as potassium hydroxide. Non-ionic emulsifiers are preferably used in case the polyolefin wax emulsion is used as internal release agent; the potlife of the emulsion used in combination with the polyisocyanate is improved, ensuring enough processing window in wood mills.

Examples of suitable cationic emulsifiers include alkyl dimethylamines and quaternary ammonium compounds.

The aqueous emulsion of the polyolefin wax useful in the present process should contain a sufficient amount of the polyolefin wax to provide a coverage of about 0.1 to about 0.9 and preferably about 0.2 to about 0.5 milligrams of the polyolefin wax per square cm of lignocellulosic material. Generally, the lower levels of polyolefin wax are preferred as they are more cost effective. When taking the emulsifiers into account, the aqueous emulsions used in the present invention will contain about 1 to about 40%, preferably about 1.25 to about 10% and more preferably about 2.5 to about 5.0% by weight of total solids. In the case of use of the polyolefin wax emulsion as internal release agent the solids content is preferably between 7 and 30%, most preferably between 10 and 20% by weight. The emulsions are usually made at 30 to 40% total solids, transported to the point of use and then diluted with water to the desired concentration. The cost of transporting water can thereby be eliminated. The additional dilution is also desirable for reduction in viscosity to facilitate spraying.

In general, it has been found that the present polyolefin wax emulsion when used as external release agent may be applied to the lignocellulosic material in an amount of about 2 to about 35 and preferably about 8 to about 16 and most preferably about 10 milligram/square cm. However, it is understood that the amount of application can be varied as needed for a particular purpose.

The aqueous emulsions used in the present process may also contain other additives, such as flame retardants, lignocellulosic preserving agents, fungicides, waxes, sizing agents, fillers, surfactants, other binders (such as formaldehyde condensate adhesives) and catalysts.

A particularly preferred polyethylene wax emulsion which can be used in the present process is ADD 9887, available from Imperial Chemical Industries, which is a 30% non-ionic emulsion of AC 6702, ADD 9897 and ADD 9898, both also available from Imperial Chemical Industries and BSP-32W available from Blackhawk Specialties, Inc. of Rock Island, Ill.

A particularly preferred polypropylene wax emulsion which can be used in the present process is ME 42040 available from Michelman, Inc. of Cincinnati, Ohio, which is a 40% anionic emulsion of Epolene E-43.

Using a polyolefin wax emulsion as described above in the process for binding lignocellulosic material with polyisocyanates leads to improved release compared to the conventional processes. Board properties are not detrimentally influenced. Further the obtained boards have proven to be fully paintable.

Further these polyolefin wax emulsions are effective in a wider temperature range than conventional wax release agents, for example montan wax (max 185° C.) and thus higher press temperatures can be used (up to 235° C.) which speeds up the cure process.

The organic polyisocyanates which are useful as a binder according to the present invention include any organic polyisocyanate compound or mixture of organic polyisocyanate compounds provided said compounds have at least two isocyanate groups. Suitable organic polyisocyanates include diisocyanates, particularly aromatic diisocyanates, and isocyanates of higher functionality.

Examples of organic polyisocyanates which may be used in the process of the present invention include aliphatic isocyanates such as hexamethylene diisocyanate; aromatic isocyanates, such as m- and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether.

Modified polyisocyanates containing isocyanurate, carbodiimide or uretonimine groups may also be used according to the present invention. Furthermore, blocked polyisocyanates, such as the reaction product of a phenol or an oxide and a polyisocyanate, having a deblocking temperature below the temperature applied when using the polyisocyanate composition may be utilised as the organic polyisocyanate binder in the present process. The organic polyisocyanate may also be an isocyanate-ended prepolymer prepared by reacting an excess of a diisocyanate or a higher functionality polyisocyanate with a polyol.

Water-emulsifiable organic polyisocyanates like those described in UK patent no. 1444933, in European patent publication no. 516361 and in PCT patent publication no. 91/03082 can also be used.

Mixtures of isocyanates may also be used in the present process. For example, a mixture of tolylene diisocyanate isomers, such as the commercially available mixtures of 2,4- and 2,6-isomers and also the mixture of di- and higher polyisocyanates produced by phosgenation of aniline/formaldehyde condensates may be utilised as the organic polyisocyanate binder according to the present invention. Such mixtures are well-known in the art and further include the crude phosgenation products containing methylene bridged polyphenylpolyisocyanates, including diisocyanate, triisocyanate and higher polyisocyanates together with any phosgenation by-products.

Preferred isocyanates useful in the present invention include those wherein the isocyanate is an aromatic diisocyanate or polyisocyanate of higher functionality, such as pure diphenylmethane diisocyanate or mixture of methylene bridged polyphenyl polyisocyanates containing diisocyanates, triisocyanates and higher functionality polyisocyanates. Such materials are prepared by the phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as "polymeric MDI". Both polymeric MDI and emulsifiable MDI or aqueous emulsions thereof can be used. Preferably the polyisocyanate is liquid at room temperature.

The organic polyisocyanate binder composition may further comprise additives conventionally used in the art such as flame retardants, lignocellulosic preserving agents, fungicides, waxes, sizing agents, fillers, catalysts, surfactants and other binders such as formaldehyde condensate adhesives.

The organic polyisocyanate binder is generally applied to the lignocellulosic material in an amount of about 0.1 to about 25, preferably about 1 to about 10 and most preferably about 2 to about 6% by weight based upon the dry weight of the lignocellulosic material.

According to the process of the present invention, the lignocellulosic material is brought into contact with the organic polyisocyanate binder material by means of mixing, blending, spraying and/or spreading the polyisocyanate composition with or onto the lignocellulosic material. Such application may generally take place in a conventional blender. Thereafter, the treated lignocellulosic material is formed into a mat, preferably upon a screen. The treated lignocellulosic material is then conveyed to a press where pressure is applied thereto at elevated temperatures. The pressing operation generally consists of pressing at 120° C. to 260° C. at pressures of about 2 to 6 MPa. Such binding processes are commonly known in the art. However, it will be recognised by those in the art that the pressing operation may be modified as needed for a particular operation.

According to a particular embodiment of the present invention the polyolefin wax emulsion is used as an internal release agent.

The polyolefin ax emulsion is either pre-mixed with the polyisocyanate binder and applied to the lignocellulosic material as one stream; this route is advisable when the polyisocyanate is used as an aqueous emulsion or suspension. Otherwise the polyolefin wax emulsion and the polyisocyanate binder are applied, preferably simultaneously, to the lignocellulosic material as two separate streams. For both processes an open time of several minutes on wood substrates is necessary hence the need for an extended potlife of the polyolefin wax emulsion/polyisocyanate combination. When used as internal release agent the weight ratio polyolefin wax emulsion/polyisocyanate composition is preferably in the range 1:10 to 3:1 and is most preferably 1/1.

According to another embodiment of the present invention the polyolefin wax emulsion is used as an external release agent.

The polyolefin wax emulsion is then preferably applied to the surface of the mat of polyisocyanate treated lignocellulosic material.

In both embodiments, it may be helpful, but not essential, to condition or "prime" the caul plates of the pressing equipment at the start of a manufacturing run by spraying their surfaces with the polyolefin wax emulsion external release agent of the present invention or any other conventional external release agent. A preconditioned press may then be used many times without further treatment. Alternatively boards can be pressed continuously between endless steel belts in presses having the temperature and pressure requirements discussed above.

While the process is particularly suitable for the manufacture of waferboard known extensively as oriented strand board and would largely be used for such manufacture, the process should not be regarded as limited in this regard. The present process can also be used in the manufacture of various types of composite structures, such as medium density fiberboard, particle board (also known as chipboard) and plywood.

The lignocellulosic material suitable for use in the present process includes all types known in the industry, such as wood strands, wood chips, wood fibers, shavings, veneers, wood wool, cork, bark; sawdust and similar waste products of the woodworking industry as well as other materials having a lignocellulosic basis such as paper, bagasse, straw, flax, sisal, hemp, rushes, reeds, rice hulls, husks, grass, nutshells and the like. Moreover, the lignocellulosic material may be mixed with other particulate or fibrous materials such as mineral fillers, glass fiber, mica, rubber, textile waste such as plastic fibers and fabrics.

The sheets and moulded bodies produced according to the present invention have excellent mechanical properties and they may be used in any of the situations where such articles are customarily used.

The invention is illustrated but not limited by the following examples. SUPRASEC and RUBINATE are trademarks of Imperial Chemical Industries.

EXAMPLE 1

Different polyethylene wax emulsions were tested on release performance against montan wax emulsion (ADD X9255, available from Imperial Chemical Industries, solids content 10%):

E 1 being an aqueous non-ionic emulsion of AC 5120, 10% solids;

E 2 being an aqueous cationic emulsion of AC 629, 10% solids;

E 3 being an aqueous non-ionic emulsion of AC 629, 10% solids;

E 4 being an aqueous non-ionic emulsion of AC 316, 10% solids;

E 5 being an aqueous non-ionic emulsion of AC 330, 10% solids;

E 6 being an aqueous cationic emulsion of AC 330, 10% solids;

E 7 being an aqueous cationic emulsion of AC 6702, 10% solids;

AC 5120 being a polyethylene wax available from Allied Signal having a Mettler Drop Point of 92° C., a hardness (ASTM D-5) of 8 dmm and a viscosity of 650 cPs at 140° C.;

AC 629 being a polyethylene wax available from Allied Signal having a Mettler Drop Point of 101° C., a hardness (ASTM D-5) of 5.5 dmm and a viscosity of 200 cPs at 140° C.;

AC 316 being a polyethylene wax available from Allied Signal having a Mettler Drop Point of 140° C., a hardness (ASTM D-5) of <0.5 dmm and a viscosity of 8500 cPs at 150° C.;

AC 330 being a polyethylene wax available from Allied Signal having a Mettler Drop Point of 137° C., a hardness (ASTM D-5) of <0.5 dmm and a viscosity of 3600 cPs at 150° C.;

AC 6702 being a polyethylene wax available from Allied Signal having a Mettler Drop Point of 88° C., a hardness (ASTM 1321) of 90 dmm and a viscosity of 35 cPs at 140° C.

Woodchips 5 mesh (available from Wood Treatment LTD) were sprayed with a 50/50 emulsion of a polyisocyanate composition (SUPRASEC 1042, available from Imperial Chemical Industries) and a 'release wax emulsion' (montan wax or a polyethylene wax as mentioned above), both at 6% loading based on dry wood. Wood moisture content before blending: 2%; Press platen temperature: 195° C.; Press factor: 15 sec/mm; Board size: 200 mm×400 mm×4 mm; caul plates: sandblasted mild steel; density: 650 kg/m$^3$.

The release performance was assessed using the release test procedure described below.

Release Test Procedure.

This procedure contains an internal standard (=the reference) and is designed so that the standard just releases at 195° C.

1) Remove all dirt and impurities from the caul plates (500×500 mm) by sandblasting.
2) Remove remaining dust and degrease the caul plates with acetone.
3) Divide the caul plates in two halves. Coat one half with 12 g/m$^2$ of a reference wax, coat the other half with 12 g/m$^2$ of the other wax (only before the first press load).
4) In the mean time prepare two blends; one containing the reference wax, the other containing the other wax.
5) Make two separate mats with the split matformer on the caul plates. The mat with the reference wax goes on the reference side of the caul plate, the other mat on the other side.
6) Move the caul plates into the press and start the press cycle. Both boards will be pressed at the same time.
7) After the press cycle is finished, remove the caul plates from the press and separate the plates releasing the boards. At this stage carefully observe the release process of both boards. Compare the force to release the suspect board and the resulting woodfailure to the reference.
8) Give a mark to the reference and the suspect board according to the following scale:

5: The board is free from the caul plates. Perfect release. 0% woodfailure.

4: The board is attached to the caul plate but only needs a little force to release it. 0–10% woodfailure.

3: The board is firmly attached to the caul plate and needs a lot more force to be released. 10–50% woodfailure.

2: The board is stuck to the caul plate but still can be removed from it in one piece. 50% woodfailure.

1: The board is stuck to the caul plates and can not be removed from it in one piece.

9) Make a series of 5 consecutive boards using the same set of caul plates. Make sure the caul plates do not cool down too far in between two pressings.
10) After completion of a series compare the release properties of the suspect sample to the reference.

As internal reference (Ref.) montan wax emulsion (ADD X9255) was used.

The results are given in table 1. These results show that generally the polyethylene wax emulsions have a release performance comparable to the montan wax emulsion. Emulsion 7 shows a better release performance than montan wax.

TABLE 1

| Board | Ref | E 1 | Ref | E 2 | Ref | E 3 | Ref | E 4 | Ref | E 5 | Ref | E 6 | Ref | E 7 |
|---|---|---|---|---|---|---|---|---|---|---|---|---|---|---|
| 1 | 4.5 | 4.5 | 4.5 | 4 | 4.5 | 4.5 | 4.5 | 4 | 4.5 | 4.5 | 4.5 | 1 | 4.5 | 4.5 |
| 2 | 4.5 | 4 | 4 | 3.5 | 4 | 4.5 | 4.5 | 3.5 | 4.5 | 4 | | | 4.5 | 4.5 |
| 3 | 3.5 | 3.5 | 4 | 3.5 | 3.5 | 4 | 3.5 | 3.5 | 4 | 4 | | | 3.5 | 4.5 |
| 4 | 3 | 3 | 4 | 2.5 | 3.5 | 3 | 3.5 | 3.5 | 4 | 4 | | | 3.5 | 4.5 |
| 5 | 3.5 | 1 | 4 | 3 | 3.5 | 2.5 | 3.5 | 2.5 | 4 | 3.5 | | | 3.5 | 4.5 |

EXAMPLE 2

Woodchips 5 mesh (available from Wood Treatment LTD) were sprayed with a 50/50 emulsion of a polyisocyanate composition (SUPRASEC 1042 available from Imperial Chemical Industries) and emulsion E 7 (as used in Example 1), both at 6% loading based on dry wood. Wood moisture content before blending: 2%; Press platen temperature was for the first 20 boards 195° C. and for the following 10 boards on the same caul plates 215° C. Press factor: 15 sec/mm; Board size: 400 mm×400 mm×4 mm; Caul plates: sandblasted mild steel; Density: 650 kg/m$^3$. Before the first press load, the caul plates were coated with 12 g/m$^2$ of the E 7 emulsion.

Release from the press plates was checked (for a consecutive run of 20 boards at 195° C. and 10 boards at 215° C.) and quoted as in Example 1. Good release was obtained on all 30 pressloads (quoting: 4.5→ no woodfailure, but not sliding off the caul plates).

These results show that the release performance of Emulsion 7 is still good at a temperature of 215° C., in contrast to montan wax that loses its release performance above 195° C.

EXAMPLES 3–6

Woodchips 5 mesh (available from Wood Treatment LTD) were sprayed with a 50/50 emulsion of a polyisocyanate composition (SUPRASEC 1042 available from Imperial Chemical Industries) and a 'release wax emulsion' (montan wax: ADD X9255 available from Imperial Chemical Industries or Emulsion 7 as in Example 1), both at 6% loading based on dry wood. Wood moisture content before blending: 2%; Press platen temperature: 195° C.; Press factor: 15 sec/mm; Board size: 400 mm×400 mm×12 mm; Caul plates: sandblasted mild steel; Density: 720 kg/m$^3$.

Boards were made under conditions as described above: Example 3 using montan wax as release wax and pressed immediately after blending; Example 4 using montan wax as release wax and pressed 30 minutes after blending; Example 5 using Emulsion 7 as release wax and pressed immediately after blending; Example 6 using Emulsion 7 as release wax and pressed 30 minutes after blending.

The following board properties were measured: internal bond strength (according to standard EN319) for classification of V20 as in standard DIN 68763, and swelling after 24 hours (according to standard EN 317)

The results are given in table 2.

TABLE 2

| Example No. | V20 IB (MPa) | Swelling 24 h (%) |
| --- | --- | --- |
| 3 | 0.93 | 15.5 |
| 4 | 1.11 | 13.3 |
| 5 | 1.05 | 16.6 |
| 6 | 1.05 | 17.1 |

These results show no significant differences in board properties using montan wax emulsion or polyethylene wax emulsion as release agent and also no significant differences in board properties between boards made immediately after blending and boards made 30 minutes after blending.

EXAMPLE 7

Northern pine OSB-flakes were sprayed with a 50/50 emulsion of a polyisocyanate composition (SUPRASEC 1042 available from Imperial Chemical Industries) and Emulsion 7 as used in Example 1, both at 6% loading based on dry wood. Wood moisture content premat: 11%; Press platen temperature was for the first 5 boards 195° C. and for the following 7 boards on the same caul plates 215° C. Press factor: 15 sec/mm; Board size: 400 mm×400 mm×4 mm; Caul plates: sandblasted mild steel; Density: 650 kg/m$^3$. Before the first press load, the caul plates were coated with 12 g/m$^2$ of the Emulsion 7.

Release from the press plates was checked (for a consecutive run of 5 boards at 195° C. and 7 boards at 215° C.) and quoted in the same way as in Example 1.

The results are shown in table 3.

TABLE 3

| Temperature | Release (individual quoting) |
| --- | --- |
| 195° C. | 4 / 4.5 / 4.5 / 4 / 4 |
| 215° C. | 4 / 4 / 4 / 4 / 3.5 / 4 / 3.5 |

EXAMPLE 8–10

An emulsion comprising 50 pbw of polyisocyanate (polymeric MDI, SUPRASEC 1042, available from Imperial Chemical Industries) and 50 pbw of a polyethylene wax emulsion based on AC 6702, available from Allied-Signal, was prepared and potlife (=period between preparation and beginning of foaming of the emulsion) was measured.
Example 8: SUPRASEC 1042 with a cationic emulsion of AC 6702 (10% solids);
Example 9: SUPRASEC 1042 with a non-ionic emulsion of AC 6702 (10% solids);
Example 10: SUPRASEC 1042 with a non-ionic emulsion of AC 6702 (30% solids).

The results are given in table 4.

TABLE 4

| Example No. | Potlife at room temperature |
| --- | --- |
| 8 | 7 min. |
| 9 | 20 min. |
| 10 | 4 min. |

These results show that only Example 9 relating to a non-ionic emulsion containing 10% solids gives a potlifetime suitable for production. The non-ionic emulsion containing 30% solids (Example 10) and the cationic emulsion are reacting too fast with the polyisocyanate.

EXAMPLE 11

Northern pine OSB-flakes were sprayed with a 50/50 emulsion of a polyisocyanate composition (SUPRASEC 1042 available from Imperial Chemical Industries) and a non-ionic emulsion of AC 6702, available from Allied-Signal, containing 10% solids, both at 6% loading based on dry wood. Separately an additional 1.2% solids on dry wood of the AC 6702 emulsion was sprayed on the flakes. Wood moisture content premat: 12%; Press platen temperature was 200° C. Press factor: 15 sec/mm; Board size: 400 mm×400 mm×4 mm; caul plates: sandblasted G54 (available from Berndorf); density: 650 kg/m$^3$. Before the first press load, the caul plates were coated with 12 g/m$^2$ of the AC 6702-emulsion (10% solids non-ionic emulsion).

Release from the press plates was checked (for a consecutive run of 200 boards) and quoted as in Example 1.

The release performance for all 200 boards was quoted with mostly 4's (and some 5's).

These results show that with above formulation the release performance on Northern pine OSB-flakes is good.

EXAMPLE 12–15

Wood chips (ex-Solvabois) were sprayed with a 50/50 emulsion of a polyisocyanate composition (SUPRASEC 1042 available from Imperial Chemical Industries) and a 'release wax emulsion' (montan wax: ADD X9255 available from Imperial Chemical Industries or 10% solids emulsion of polyethylene wax AC 6702, available from Allied Signal), both at 6% loading based on dry wood. Wood moisture content before blending: 2%; Press platen temperature: 195° C.; Press factor: 15 sec/mm; Board size: 400 mm×400 mm×12 mm; caul plates: sandblasted mild steel; density: 720 kg/m$^3$.

Boards were made under conditions as described above.
Example 12 with montan wax and without paraffin wax;
Example 13 with montan wax+1% (on dry wood) paraffin wax emulsion (SPG 60 available from Condea Chemie);
Example 14 with AC 6702 non-ionic emulsion (10% solids) and without paraffin wax;
Example 15 with AC 6702 non-ionic emulsion (10% solids)+1% (on dry wood) paraffin wax emulsion (SPG 60 available from Condea Chemie).

The following board properties were measured: internal bond strength (according to standards EN 319 and EN 1087) for classification of V20 and V100 as in standard DIN 68763, and swelling after 24 hours (according to standard EN 317).

The results are given in table 5.

These results show no difference in physical properties of boards made using montan wax emulsion and polyethylene wax emulsion. Also the influence of the paraffin wax is the same for both release waxes.

TABLE 5

| Example No. | V20 IB (MPa) | V100 IB (MPa) | Swelling 24 h (%) |
|---|---|---|---|
| 12 | 1.13 | 0.27 | 13.6 |
| 13 | 1.17 | 0.15 | 10.8 |
| 14 | 1.18 | 0.19 | 13.6 |
| 15 | 1.02 | 0.12 | 11.8 |

EXAMPLE 16

Northern pine OSB-flakes were sprayed with a polyisocyanate composition (SUPRASEC 1453, available from Imperial Chemical Industries) at 6% binder loading based on dry wood.

Separately a polyethylene wax non-ionic emulsion based on AC 6702 available from Allied Signal (for the first 10 boards at 30% solids, for the next 10 boards at 20% solids, and for the further next 40 boards at 10% solids) was sprayed on the flakes at 6% loading based on dry wood. Wood moisture content premat: 10%; Press plates temperature: 200° C.; Press factor: 15 sec/mm; Board size: 400 mm×400 mm×4 mm; caul plates: sandblasted G54 (available from Berndorf); density: 650 kg/m$^3$. Before the first press load the caul plates were coated with 12 g/m$^2$ of the AC 6702 emulsion (10% solids; non-ionic emulsion).

Release from the press plates was checked (first 10 boards: AC 6702 emulsion 30% solids, next 10 boards: AC 6702 emulsion 20% solids, and next 40 boards: AC 6702 emulsion 10% solids) and quoted as in Example 1.

The release performance for all boards was quoted with 5's.

These results show that with above formulation (SUPRASEC 1453 in combination with AC 6702 emulsion) the release performance for Northern pine OSB-boards is perfect.

EXAMPLE 17–19

Wood fibres (ex-Bestwood) were sprayed with a 50/50 emulsion of a polyisocyanate composition (SUPRASEC 1410 available from Imperial Chemical Industries) and a 'release wax emulsion' (montan wax: ADD X9255 available from Imperial Chemical Industries or AC 6702 (available from Allied Signal, 10% solids emulsion), both at 0.6% (solids) loading based on dry wood and a parafin wax-emulsion (SPG60 available from Condea Chemie) at 1% (solids) loading based on dry wood.

Wood moisture content before blending: 7%; Premat moisture content: 12%; Press platen temperature: 185° C.; Press factor: 15 sec/mm; Board size: 400 mm×400 mm×12 mm; caul plates: sandblasted mild steel; density 750 kg/m$^3$.

Boards were made under conditions as described above.

In example 17 montan wax (10% solids) was used; in examples 18 and 19 the AC 6702-emulsion (10% solids) was used.

The following board properties were measured: internal bond strength (according to standards EN 319 and EN 1087) for classification of V20 and V100 as in standard DIN 68763, and swelling after 24 hours (according to standard EN 317).

The results are presented in table 6.

TABLE 6

| Example No. | V20 IB (MPa) | V100 IB (MPa) | Swelling 24 h (%) |
|---|---|---|---|
| 17 | 0.95 | 0.44 | 10.2 |
| 18 | 0.88 | 0.33 | 9.6 |
| 19 | 0.88 | 0.35 | 9.3 |

These results show that there is no difference in physical properties between boards made using montan wax emulsion and boards made using the AC 6702 polyethylene wax emulsion.

EXAMPLE 20

Scots pine OSB-flakes were sprayed with a polyisocyanate composition (SUPRASEC 1453, available from Imperial Chemical Industries) at 6% binder loading based on dry wood.

Wood moisture content premat=10%; Press plates temperature: 200° C.; Press factor: 15 sec/mm; Board size: 400 mm×400 mm×4 mm; caul plates sandblasted G54 (available from Berndorf); density: 650 kg/m$^3$. Before pressing of the board a release agent was used externally: a polyethylene wax-emulsion (ADD9887, available from Imperial Chemical Industries, diluted to 10% solids) was sprayed on top of the premat and wiped on the bottom plate.

Release from the press plates was checked and quoted as in example 1. The results are presented in table 7.

TABLE 7

| Board | Release Bottom | Release Top | ADD9887 (10%) g | Bottom g/m$^2$ | ADD9887 (10%) g | Top g/m$^2$ |
|---|---|---|---|---|---|---|
| 1 | 5 | 4.5 | 4 | 1.6 | 18 | 7.2 |
| 2 | 5 | 5 | 6 | 2.4 | 6 | 2.4 |
| 3 | 5 | 5 | 3 | 1.2 | 3.7 | 1.48 |
| 4 | 5 | 5 | 0 | 0 | 4.5 | 1.8 |
| 5 | 5 | 5 | 0 | 0 | 3.5 | 1.4 |

These results show that the release performance for boards made using SUPRASEC 1453 in combination with a polyethylene wax emulsion applied externally at a loading of less than 3 g/m$^2$ is good.

EXAMPLE 21

Scots pine OSB-flakes were sprayed with a polyisocyanate composition (SUPRASEC DUR, available from Imperial Chemical Industries) at 6% binder loading based on dry wood.

Separately a polyethylene wax-emulsion (ADD 9887, available from Imperial Chemical Industries) was sprayed on the flakes at 1.2% solids loading based on dry wood.

Wood moisture content premat=10k; Press plates temperature: 200° C.; Press factor: 15 sec/mm; Board size: 400 mm×400 mm×4 mm; caul plates: sandblasted G54 (available from Berndorf); density: 650 kg/m³. Before the first press load, the caul plates were coated with 12 g/m² of the ADD 9887-emulsion (10% solids).

Release from the press plates was checked and quoted as above for 20 boards.

The release performance for all boards was quoted with 4's.

These results show that with above formulation (SUPRASEC DNR in combination with ADD9887) the release performance for Scots pine OSB-boards is satisfactory.

EXAMPLE 22

In the following examples, a ¼" board was prepared from pine flakes available from Louisiana Pacific of Athens, Ga. or J. M. Huber of Commerce, Ga. Twenty pounds of pine flakes were blended with a sufficient amount of RUBINATE M polymeric polyisocyanate, available from ICI Americas Inc., to provide 4% of the polyisocyanate based on the dry weight of the flakes. 100% of slack wax was then applied to the treated pine flakes to provide water resistance. The treated pine flakes were then placed on a woven steel screen and formed into a mat having a thickness of about ¾ to 2 inch thickness depending upon the moisture content, but generally about 1.5 inches.

In Examples A–D, the surface of the mat was then sprayed with an aqueous emulsion of an oxidized polyethylene wax containing tall oil fatty acid emulsifiers having a total solids content of 20% available from Blackhawk Specialties Inc. and identified as BSP-32W. The solids content of the emulsion was varied from 10% to 5% to 2.5% to 1.25% in Examples A, B, C and D, respectively through the addition of water. Ten grams of the emulsion were then applied to the surface of the mat to provide 1, 0.5, 0.25 and 0.125 gram of solids per square foot of the mat, respectively. In Examples E, F and G the mat was sprayed with an aqueous emulsion of an oxidized polypropylene wax and non-ionic emulsifiers available from Michelman, Inc., of Cincinnati, Ohio. and identified as Michen 43040. The solids content of the emulsion was varied from 10% to 5% to 2.5% in examples E, F and G, respectively.

The mat and screen were then pressed in a Lawton 200 ton press at 400° F. The press cycle comprised a 30 second close, a 25 second/6th inch cook; and a 10 second open.

After each board was pressed in the manner described above, the press plates were opened and examined to determine the extent to which the pine flakes adhered to the plates. The extent of adhesion was evaluated as above.

Tables 8, 9, 10 and 11 contain the release results for the oxidized polyethylene wax emulsion at 10% solids, 5.0% solids, 2.5% solids and 1.25% solids, respectively. Tables 12, 13 and 14 contain the release results for the oxidized polypropylene wax emulsion at 10% solids, 5% solids and 2.5% solids respectively.

TABLE 8

| Board | Release from Top Plate | Release from Bottom Screen |
|---|---|---|
| 1 | 4 | 3 |
| 2 | 5 | 3 |
| 3 | 5 | 3 |
| 4 | 5 | 3 |
| 5 | 5 | 3 |
| 6 | 5 | 3 |
| 7 | 5 | 3 |
| 8 | 5 | 3 |
| 9 | 5 | 3 |
| 10 | 5 | 3 |

TABLE 9

| Board | Release from Top Plate | Release from Bottom Screen |
|---|---|---|
| 1 | 3[a] | 3 |
| 2 | 4 | 3 |
| 3 | 5 | 3 |
| 4 | 5 | 3 |
| 5 | 5 | 3 |
| 6 | 5 | 3 |
| 7 | 5 | 3 |
| 8 | 5 | 3 |
| 9 | 5 | 3 |
| 10 | 5 | 3 |

[a] = with less than 5% wood failure

TABLE 10

| Board | Release from Top Plate | Release from Bottom Screen |
|---|---|---|
| 1 | 3[b] | 3 |
| 2 | 4 | 3 |
| 3 | 5 | 3 |
| 4 | 5 | 3 |
| 5 | 5 | 3 |
| 6 | 5 | 3 |
| 7 | 5 | 3 |
| 8 | 5 | 3 |
| 9 | 5 | 3 |
| 10 | 5 | 3 |

[b] = with less than 1% wood failure

TABLE 11

| Board | Release from Top Plate | Release from Bottom Screen |
|---|---|---|
| 1 | 3[c] | 3 |
| 2 | 4 | 3 |
| 3 | 4 | 3 |
| 4 | 4 | 3 |
| 5 | 4 | 3 |
| 6 | 4 | 3 |
| 7 | 4 | 3 |
| 8 | 5 | 3 |
| 9 | 4 | 3 |
| 10 | 4 | 3 |

[c] = with 10–15% wood failure

TABLE 12

| Board | Release from Top Plate | Release from Bottom Screen |
|---|---|---|
| 1 | 5 | 4 |
| 2 | 5 | 4 |
| 3 | 5 | 4 |
| 4 | 5 | 4 |
| 5 | 5 | 4 |

TABLE 13

| Board | Release from Top Plate | Release from Bottom Screen |
|---|---|---|
| 1 | 5 | 3 |
| 2 | 5 | 3 |
| 3 | 5 | 3 |
| 4 | 5 | 3 |
| 5 | 5 | 3 |

TABLE 14

| Board | Release from Top Plate | Release from Bottom Screen |
|---|---|---|
| 1 | 5 | 3 |
| 2 | 5 | 3 |
| 3 | 5 | 3 |
| 4 | 5 | 3 |
| 5 | 5 | 3 |

Accordingly, it can be seen from the Examples set forth above that the aqueous emulsions of oxidized polyolefins utilized in the present invention provide generally excellent release qualities at concentrations of 2.5 to 10% solids. The 1.25% solids emulsion provided adequate release properties. In most of these test runs, the first press was evaluated as a "3", indicating that the plates should be pretreated with the emulsion or that the substrate should be primed with increased amounts of release agents for the initial presses.

We claim:

1. A two-component system comprising a) a polyisocyanate composition and b) an aqueous emulsion of a polyolefin wax selected from the group consisting of oxidised polyethylene waxes and oxidised polypropylene waxes.

2. A system as claimed in claim 1 wherein said emulsion further comprises an emulsifying agent.

3. A system as claimed in claim 2 wherein the amount of said emulsifying agent is between 1 and 10% by weight based on total emulsion.

4. A system as claimed in claim 2 wherein said emulsifying agent is an anionic or non-ionic emulsifier.

5. A system as claimed in claim 2 wherein the aqueous emulsion contains from 1 to 40% by weight of total solids.

6. A system as claimed in claim 2 wherein the aqueous emulsion contains from 1.25 to 10% by weight of total solids.

7. A system as claimed in claim 2 wherein said polyisocyanate is selected from the group consisting of diphenylmethane diisocyanate, methylene bridged polyphenyl polyisocyanate and water-emulsifiable versions thereof.

* * * * *